(12) United States Patent
Kim et al.

(10) Patent No.: US 10,579,907 B1
(45) Date of Patent: Mar. 3, 2020

(54) METHOD FOR AUTOMATICALLY EVALUATING LABELING RELIABILITY OF TRAINING IMAGES FOR USE IN DEEP LEARNING NETWORK TO ANALYZE IMAGES, AND RELIABILITY-EVALUATING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/264,027

(22) Filed: Jan. 31, 2019

(51) Int. Cl.
*G06K 9/62* (2006.01)
*G06N 3/04* (2006.01)
*G06N 3/08* (2006.01)
*G06K 9/46* (2006.01)
*G06F 17/18* (2006.01)

(52) U.S. Cl.
CPC .......... *G06K 9/6256* (2013.01); *G06F 17/18* (2013.01); *G06K 9/4676* (2013.01); *G06K 9/6267* (2013.01); *G06N 3/0472* (2013.01); *G06N 3/084* (2013.01); *G06T 2207/20132* (2013.01)

(58) Field of Classification Search
CPC .... G06N 3/084; G06N 3/0472; G06K 9/4676; G06K 9/6256; G06K 9/6267; G06F 17/18; G06T 2207/20132
USPC .................................................. 382/157, 159
See application file for complete search history.

(56) References Cited

U.S. PATENT DOCUMENTS

| 9,767,386 B2 * | 9/2017 | Lin .................... G06K 9/00724 |
| 2018/0314943 A1 * | 11/2018 | Liang .................. G06K 9/4628 |
| 2018/0373980 A1 * | 12/2018 | Huval ...................... G06N 3/08 |

* cited by examiner

Primary Examiner — Daniel G Mariam
(74) Attorney, Agent, or Firm — Xsensus LLP (57) ABSTRACT

A method for evaluating a reliability of labeling training images to be used for learning a deep learning network is provided. The method includes steps of: a reliability-evaluating device instructing a similar-image selection network to select validation image candidates with their own true labels having shooting environments similar to those of acquired original images, which are unlabeled images, and instructing an auto-labeling network to auto-label the validation image candidates with their own true labels and the original images; and (i) evaluating a reliability of the auto-labeling network by referring to true labels and auto labels of easy-validation images, and (ii) evaluating a reliability of a manual-labeling device by referring to true labels and manual labels of difficult-validation images. This method can be used to recognize surroundings by applying a bag-of-words model, to optimize sampling processes for selecting a valid image among similar images, and to reduce annotation costs.

16 Claims, 5 Drawing Sheets

METHOD FOR AUTOMATICALLY EVALUATING LABELING RELIABILITY OF TRAINING IMAGES FOR USE IN DEEP LEARNING NETWORK TO ANALYZE IMAGES, AND RELIABILITY-EVALUATING DEVICE USING THE SAME

FIELD OF THE DISCLOSURE

The present disclosure relates to a method and a device for evaluating a labeling reliability of training images to be used for learning a deep learning network.

BACKGROUND OF THE DISCLOSURE

Recently, methods of performing object identification and the like making use of machine learning are being studied. As one of the machine learning, a deep learning, which uses a neural network with several hidden layers between an input layer and an output layer, shows high recognizing performance.

And, the neural network using the deep learning generally learns through backpropagation using losses.

In order to perform learning of such a deep learning network, training data in which tags, i.e., labels, are added to individual data points by labelers are needed. Preparing this training data (i.e. classifying the data correctly) can be very labour-intensive, expensive and inconvenient, especially if a large amount of training data is to be used and if the quality of the data pre-preparation is not consistently high. Conventional interactive labeling can be computationally expensive and fail to deliver good results.

Therefore, recently, auto-labeling which adds tags to training images using a deep learning-based auto labeling device is performed, and then inspectors examine auto-labeled training images to correct the tags or the labels.

Also, a reliability of labeling by the auto-labeling device and labelers is evaluated by adding validation images with their own true labels.

However, in a conventional method of adding the validation images to unlabeled images, if shooting environment like its neighborhood, weather, or day/night, of the unlabeled images and that of the validation images are different, the inspectors can easily distinguish between the unlabeled images and the validation images, and as a result, the inspection is prone to be performed mainly on the validation images, and labeling is not evaluated properly.

Also, if the inspection is done on the true labels only, as in the conventional method, lazy inspectors may be evaluated as higher than inspectors who work hard.

In addition, if labels of misdetection and non-detection are added to the true labels for validation, they may be different from the auto-labels by the auto-labeling device, in which case the inspectors can easily find out whether they are labels for validation, thus proper estimation is hampered.

SUMMARY OF THE DISCLOSURE

It is an object of the present disclosure to solve all the aforementioned problems.

It is another object of the present disclosure to make shooting environments of validation images to be added to original images, i.e., unlabeled images, similar to those of the original images.

It is still another object of the present disclosure to properly evaluate a reliability of labeling by allowing images hard to label correctly among auto-labeled images to be inspected.

In accordance with one aspect of the present disclosure, there is provided a method for evaluating a reliability of labeling one or more training images to be used for learning a deep learning network, including steps of: (a) a reliability-evaluating device, if one or more original images are acquired, instructing a similar-image selection network to select validation image candidates with their own true labels having shooting environments similar to those of the original images, and instructing an auto-labeling network to auto-label the validation image candidates with their own true labels and the original images by inputting the validation image candidates with their own true labels and the original images into the auto-labeling network, wherein the original images are images that are unlabeled; and (b) the reliability-evaluating device, (i) if easy-validation images with their own true labels and auto labels are acquired from the auto-labeling network, evaluating a reliability of the auto-labeling network by referring to the true labels and the auto labels of the easy-validation images, and (ii) if difficult-validation images with their own true labels, auto labels and manual labels are acquired from a manual-labeling device, which are acquired by applying manually labeling operation to difficult-validation images with their own true labels and auto labels, evaluating a reliability of the manual-labeling device by referring to the true labels and the manual labels of the difficult-validation images, wherein the easy-validation images with their own true labels and auto labels represent images, among the auto-labeled validation image candidates with their own true labels, having a probability of being automatically labeled incorrectly less than a first prescribed value and the difficult-validation images with their own true labels and auto labels represent images, among the auto-labeled validation image candidates with their own true labels, having a probability of being automatically labeled incorrectly equal to or greater than a second prescribed value.

As one example, the method further includes a step of: (c) the reliability-evaluating device, (i) if the reliability of the auto-labeling network is equal to or greater than a first predetermined threshold, determining at least part of easy-original images with their own auto labels generated by the auto-labeling network as the training images with their own true labels, and (ii) if the reliability of the manual-labeling device is equal to or greater than a second predetermined threshold, determining at least part of difficult-original images with their own auto labels and the manual labels generated by the manual-labeling device as the training images with their own true labels, wherein the easy-original images with their own auto labels represent images, among the original images with their own auto labels generated by auto-labeling the original images, having a probability of being automatically labeled incorrectly less than a third prescribed value and the difficult-original images with their own auto labels represent images, among the original images with their own auto labels generated by auto-labeling the original images, having a probability of being automatically labeled incorrectly equal to or greater than a fourth prescribed value.

As one example, the reliability-evaluating device determines specific difficult-original images with their own auto labels and manual labels, not determined as the trainings image with their own true labels, among the difficult-original images with their own auto labels and the manual labels as the validation image candidates with their own true labels.

As one example, at the step of (a), the reliability-evaluating device instructs the similar-image selection network to (i) (i-1) acquire manipulated images generated by cropping and resizing each of regions of sliding windows on the original images, (i-2) generate each piece of top-k class information by classifying the manipulated images via an image classification CNN, and (i-3) generate at least one bag-of-words histogram of the original images by applying at least one operation, of creating at least one bag of words by referring to the top-k class information, to all of the original images, and (ii) selects a predetermined number of the validation image candidates with their own true labels, in an order of closest to the bag-of-words histogram, among the validation image candidates with their own true labels.

As one example, the reliability-evaluating device instructs the similar-image selection network to manage the difficult-validation images with their own true labels among the predetermined number of the validation image candidates and difficult-original images with their own auto labels, such that the number of the difficult-validation images with their own true labels among the predetermined number of the validation image candidates with their own true labels has a certain ratio to the number of the difficult-original images with their own auto labels among the original images.

As one example, at the step of (a), the reliability-evaluating device instructs the auto-labeling network to generate the original images with their own auto labels and the validation image candidates with their own true labels and auto labels by auto-labeling the original images and the validation image candidates with their own true labels, then (i) (i-1) generates a first image and a second image, at least one of which is transformed from one of the original images with their own auto labels and the validation image candidates with their own true labels and auto labels, wherein if only one of the first image and the second image is transformed from the original images with their own auto labels and the validation image candidates, then the other is one of the original images and the validation image candidates used as is, (i-2) instructs one or more convolutional layers to generate at least one first feature map and at least one second feature map by respectively applying one or more convolution operations respectively to the first image and the second image, and (i-3) instructs one or more pooling layers to generate one or more first pooled feature maps and one or more second pooled feature maps, by respectively applying one or more pooling operations to each of regions, corresponding to each of auto-labeled boxes of the original images with their own auto labels and the validation image candidates with their own true labels and auto labels, on each of the first feature map and each of the second feature map, and to generate one or more concatenated feature maps each of which corresponds to each of the auto-labeled boxes by concatenating each of the first pooled feature maps and each of the corresponding second pooled feature maps, (ii) instructs a deep learning classifier to acquire each of the concatenated feature maps corresponding to each of the auto-labeled boxes as its input, to thereby generate class information which classifies each of the auto-labeled boxes into an abnormal class group or a normal class group, and (iii) (iii-1) calculates each of one or more probabilities of each of abnormal class elements in the abnormal class group by referring to each piece of the class information on each of the auto-labeled boxes, (iii-2) assorts the original images with their own auto labels into easy-original images with their own auto labels and difficult-original images with their own auto labels by using each of the probabilities of each of the abnormal class elements, and (iii-3) assorts the validation image candidates with their own true labels and auto labels into the easy-validation images with their own true labels and auto labels and the difficult-validation images with their own true labels and auto labels, wherein the easy-original images with their own auto labels represent images, among the original images with their own auto labels, having a probability of being automatically labeled incorrectly less than a third prescribed value and the difficult-original images with their own auto labels represent images, among the original images with their own auto labels, having a probability of being automatically labeled incorrectly equal to or greater than a fourth prescribed value.

As one example, at the step of (b), the reliability-evaluating device, supposing that Precision(X, L)=1−[the number of misdetection boxes in L]/[the number of total boxes in L], Recall(X, L)=1−[the number of non-detection boxes in X]/[the number of the total boxes in X], and that the true labels and the auto labels of the easy-validation images are XAL and LAL, respectively, the reliability (Reliability(AL)) of the auto-labeling device is estimated by $$\text{Reliability}(AL) = F_1(X_{AL}, L_{AL}) = 2\frac{\text{Precision}(X_{AL}, L_{AL}) \times \text{Recall}(X_{AL}, L_{AL})}{\text{Precision}(X_{AL}, L_{AL}) + \text{Recall}(X_{AL}, L_{AL})}$$

As one example, at the step of (b), the reliability-evaluating device, supposing that Precision(X, L)=1−[the number of misdetection boxes in L]/[the number of total boxes in L], Recall(X, L)=1−[the number of non-detection boxes in X]/[the number of total boxes in X], and that the true labels and the manual labels of the difficult-validation images XHL and LHL, respectively, the reliability Reliability(HL) of the manual-labeling device is estimated by $$\text{Reliability}(HL) = F_1(X_{HL}, L_{HL}) = 2\frac{\text{Precision}(X_{HL}, L_{HL}) \times \text{Recall}(X_{HL}, L_{HL})}{\text{Precision}(X_{HL}, L_{HL}) + \text{Recall}(X_{HL}, L_{HL})}$$

In accordance with another aspect of the present disclosure, there is provided a reliability-evaluating device for evaluating a reliability of labeling one or more training images to be used for learning a deep learning network, including: at least one memory that stores instructions; and at least one processor configured to execute the instructions to: perform processes of: (I) if one or more original images are acquired, instructing a similar-image selection network to select validation image candidates with their own true labels having shooting environments similar to those of the original images, and instructing an auto-labeling network to auto-label the validation image candidates with their own true labels and the original images by inputting the validation image candidates with their own true labels and the original images into the auto-labeling network, wherein the original images are images that are unlabeled, and (II) (i) if easy-validation images with their own true labels and auto labels are acquired from the auto-labeling network, evaluating a reliability of the auto-labeling network by referring to the true labels and the auto labels of the easy-validation images, and (ii) if difficult-validation images with their own true labels, auto labels and manual labels are acquired from a manual-labeling device, which are acquired by applying manually labeling operation to difficult-validation images with their own true labels and auto labels, evaluating a reliability of the manual-labeling device by referring to the true labels and the manual labels of the difficult-validation images, wherein the easy-validation images with their own true labels and auto labels represent images, among the auto-labeled validation image candidates with their own true labels, having a probability of being automatically labeled incorrectly less than a first prescribed value and the difficult-validation images with their own true labels and auto labels represent images, among the auto-labeled validation image candidates with their own true labels, having a probability of being automatically labeled incorrectly equal to or greater than a second prescribed value.

As one example, the processor further performs a process of: (III) (i) if the reliability of the auto-labeling network is equal to or greater than a first predetermined threshold, determining at least part of easy-original images with their own auto labels generated by the auto-labeling network as the training images with their own true labels, and (ii) if the reliability of the manual-labeling device is equal to or greater than a second predetermined threshold, determining at least part of difficult-original images with their own auto labels and the manual labels generated by the manual-labeling device as the training images with their own true labels, wherein the easy-original images with their own auto labels represent images, among the original images with their own auto labels generated by auto-labeling the original images, having a probability of being automatically labeled incorrectly less than a third prescribed value and the difficult-original images with their own auto labels represent images, among the original images with their own auto labels generated by auto-labeling the original images, having a probability of being automatically labeled incorrectly equal to or greater than a fourth prescribed value.

As one example, the processor determines specific difficult-original images with their own auto labels and manual labels, not determined as the trainings image with their own true labels, among the difficult-original images with their own auto labels and the manual labels as the validation image candidates with their own true labels.

As one example, at the process of (I), the processor instructs the similar-image selection network to (i) (i-1) acquire manipulated images generated by cropping and resizing each of regions of sliding windows on the original images, (i-2) generate each piece of top-k class information by classifying the manipulated images via an image classification CNN, and (i-3) generate at least one bag-of-words histogram of the original images by applying at least one operation, of creating at least one bag of words by referring to the top-k class information, to all of the original images, and (ii) selects a predetermined number of the validation image candidates with their own true labels, in an order of closest to the bag-of-words histogram, among the validation image candidates with their own true labels.

As one example, the processor instructs the similar-image selection network to manage the difficult-validation images with their own true labels among the predetermined number of the validation image candidates and difficult-original images with their own auto labels, such that the number of the difficult-validation images with their own true labels among the predetermined number of the validation image candidates with their own true labels has a certain ratio to the number of the difficult-original images with their own auto labels among the original images.

As one example, at the process of (I), the processor instructs the auto-labeling network to generate the original images with their own auto labels and the validation image candidates with their own true labels and auto labels by auto-labeling the original images and the validation image candidates with their own true labels, then (i) (i-1) generates a first image and a second image, at least one of which is transformed from one of the original images with their own auto labels and the validation image candidates with their own true labels and auto labels, wherein if only one of the first image and the second image is transformed from the original images with their own auto labels and the validation image candidates, then the other is one of the original images and the validation image candidates used as is, (i-2) instructs one or more convolutional layers to generate at least one first feature map and at least one second feature map by respectively applying one or more convolution operations respectively to the first image and the second image, and (i-3) instructs one or more pooling layers to generate one or more first pooled feature maps and one or more second pooled feature maps, by respectively applying one or more pooling operations to each of regions, corresponding to each of auto-labeled boxes of the original images with their own auto labels and the validation image candidates with their own true labels and auto labels, on each of the first feature map and each of the second feature map, and to generate one or more concatenated feature maps each of which corresponds to each of the auto-labeled boxes by concatenating each of the first pooled feature maps and each of the corresponding second pooled feature maps, (ii) instructs a deep learning classifier to acquire each of the concatenated feature maps corresponding to each of the auto-labeled boxes as its input, to thereby generate class information which classifies each of the auto-labeled boxes into an abnormal class group or a normal class group, and (iii) (iii-1) calculates each of one or more probabilities of each of abnormal class elements in the abnormal class group by referring to each piece of the class information on each of the auto-labeled boxes, (iii-2) assorts the original images with their own auto labels into easy-original images with their own auto labels and difficult-original images with their own auto labels by using each of the probabilities of each of the abnormal class elements, and (iii-3) assorts the validation image candidates with their own true labels and auto labels into the easy-validation images with their own true labels and auto labels and the difficult-validation images with their own true labels and auto labels, wherein the easy-original images with their own auto labels represent images, among the original images with their own auto labels, having a probability of being automatically labeled incorrectly less than a third prescribed value and the difficult-original images with their own auto labels represent images, among the original images with their own auto labels, having a probability of being automatically labeled incorrectly equal to or greater than a fourth prescribed value.

As one example, at the process of (II), the processor, supposing that Precision(X, L)=1−[the number of misdetection boxes in L]/[the number of total boxes in L], Recall(X, L)=1−[the number of non-detection boxes in X]/[the number of the total boxes in X], and that the true labels and the auto labels of the easy-validation images are XAL and LAL, respectively, the reliability (Reliability(AL)) of the auto-labeling device is estimated by $$\text{Reliability}(AL) = F_1(X_{AL}, L_{AL}) = 2 \frac{\text{Precision}(X_{AL}, L_{AL}) \times \text{Recall}(X_{AL}, L_{AL})}{\text{Precision}(X_{AL}, L_{AL}) + \text{Recall}(X_{AL}, L_{AL})}$$

As one example, at the process of (II), the processor, supposing that Precision (X, L)=1−[the number of misdetection boxes in L]/[the number of total boxes in L], Recall (X, L)=1−[the number of non-detection boxes in X]/[the number of total boxes in X], and that the true labels and the manual labels of the difficult-validation images XHL and LHL, respectively, the reliability Reliability(HL) of the manual-labeling device is estimated by $$\text{Reliability}(HL) =$$
$$F_1(X_{HL}, L_{HL}) = 2\frac{\text{Precision}(X_{HL}, L_{HL}) \times \text{Recall}(X_{HL}, L_{HL})}{\text{Precision}(X_{HL}, L_{HL}) + \text{Recall}(X_{HL}, L_{HL})}$$

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

Figure 1:
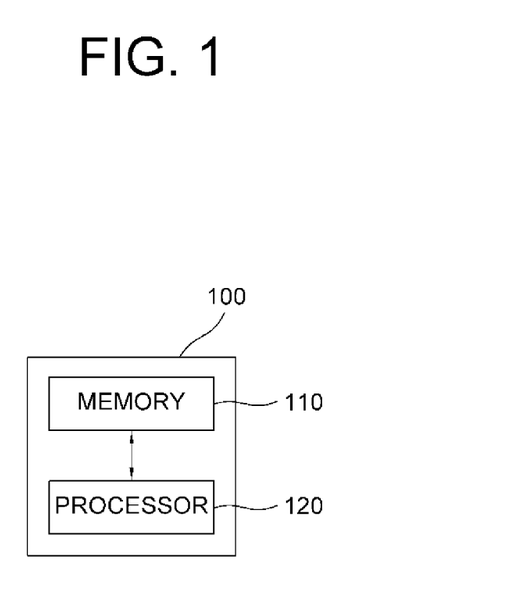
FIG. 1 is a drawing schematically illustrating a reliability-evaluating device for evaluating a reliability of labeling of training images to be used for learning a deep learning network in accordance with one example of the present disclosure.

FIG. 1 is a drawing schematically illustrating a reliability-evaluating device for evaluating a reliability of labeling of training images to be used for learning a deep learning network in accordance with one example of the present disclosure. By referring to FIG. 1, the reliability-evaluating device 100 may include a memory 110 for storing instructions to evaluate the reliability of labeling the training images, and a processor 120 for performing processes to evaluate the reliability corresponding to the instructions in the memory 110.

Specifically, the reliability-evaluating device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Figure 2:
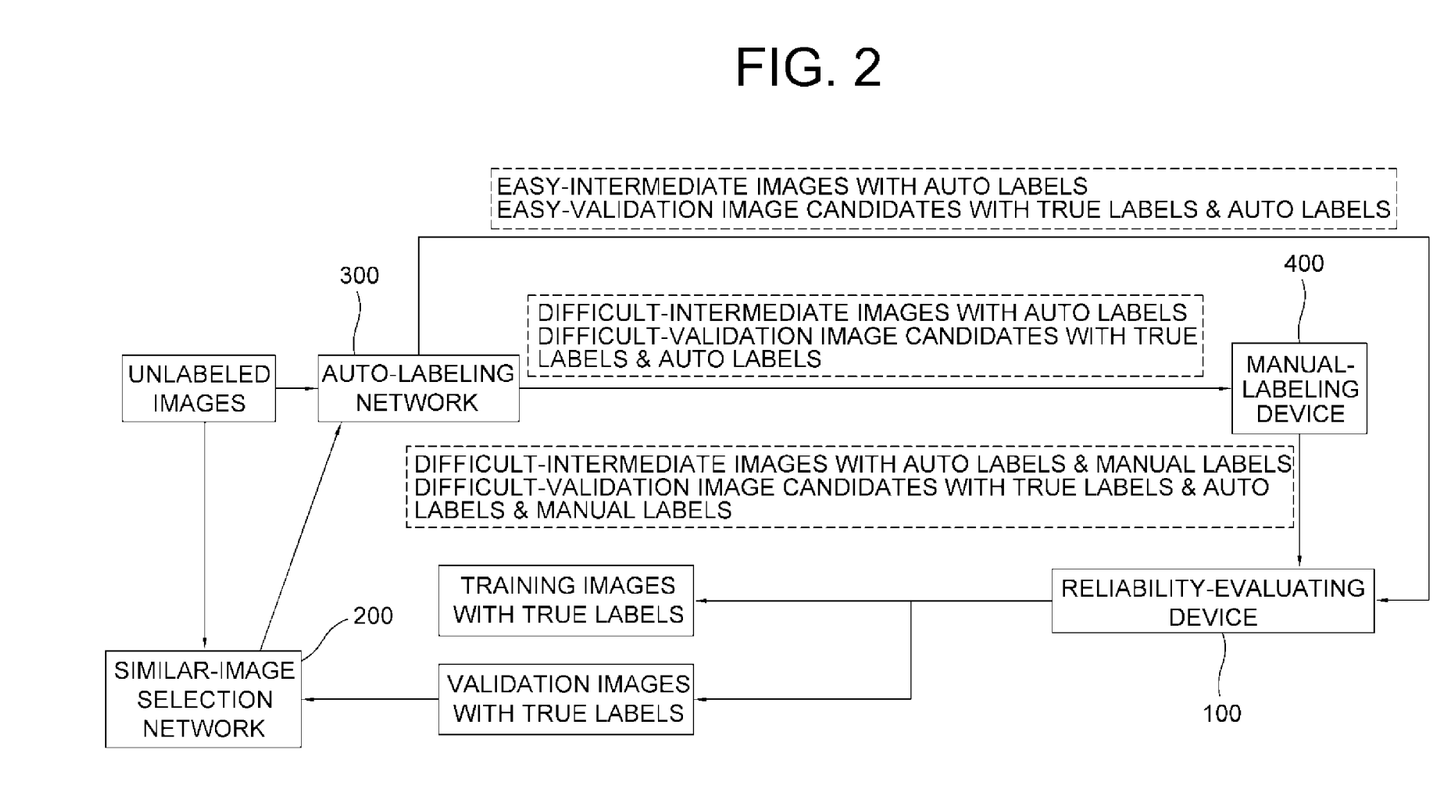
FIG. 2 is a drawing schematically illustrating a method for evaluating the reliability of labeling of the training images to be used for learning the deep learning network in accordance with one example of the present disclosure.

A method for evaluating the reliability of labeling of the training images to be used for learning the deep learning network in accordance with one example of the present disclosure is described by referring to FIG. 2. Herein, the deep learning network may perform image analysis by using the reliability-evaluating device 100.

First, if one or more original images are acquired, the reliability-evaluating device 100 may instruct a similar-image selection network 200 to select validation image candidates with their own true labels having shooting environments similar to those of the original images, and may instruct an auto-labeling network 300 to auto-label the validation image candidates with their own true labels and the original images by inputting the validation image candidates with their own true labels and the original images into the auto-labeling network 300. Herein, the original images may be unlabeled images.

Then, the original images and the validation image candidates with their own true labels may be auto-labeled by the auto-labeling network 300 respectively to thereby be original images with their own auto labels and the validation image candidates with their own true labels and auto labels respectively.

Figure 3:
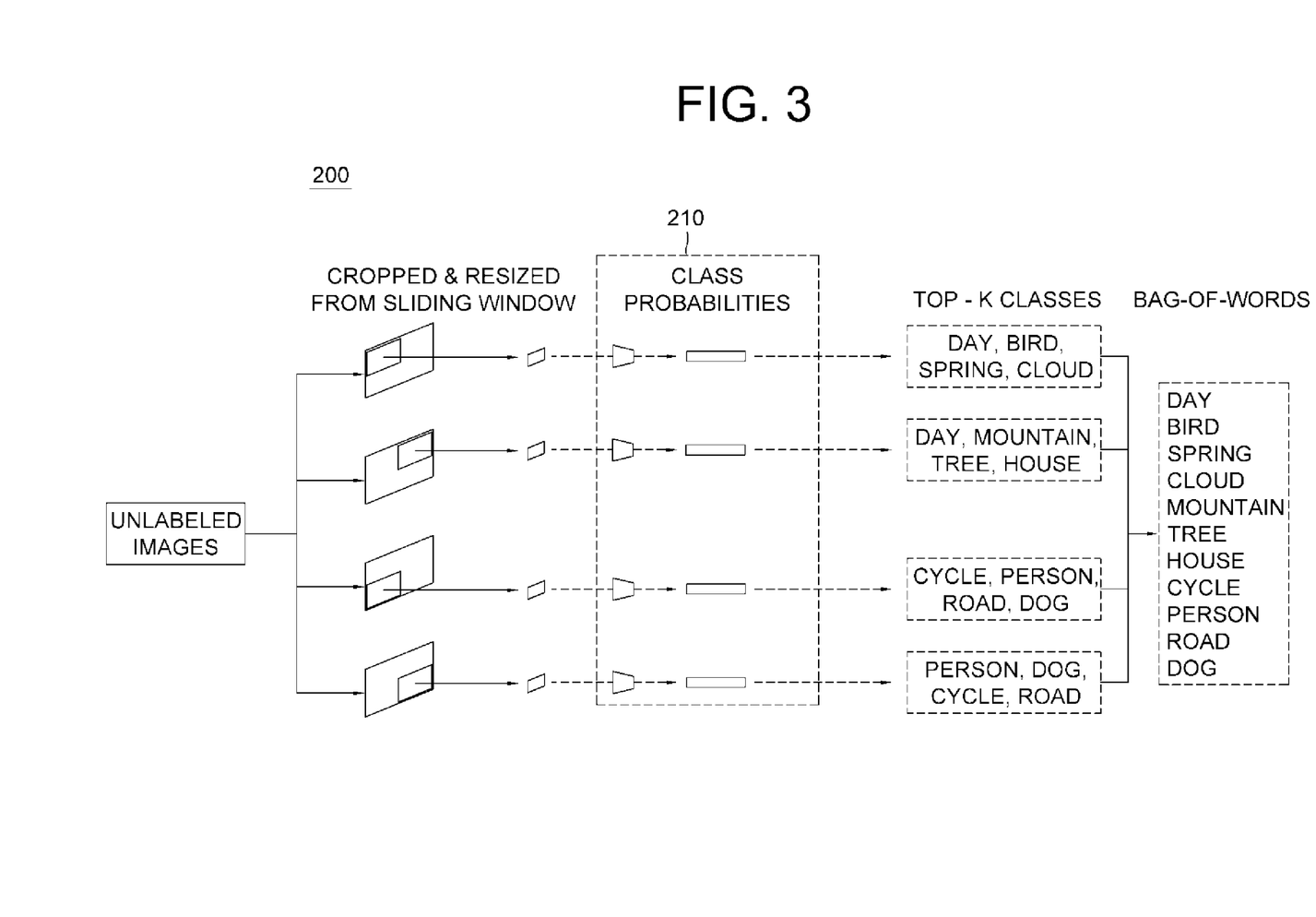
FIG. 3 is a drawing schematically illustrating a method for selecting validation images having shooting environments, among validation image candidates, similar to those of original images in a method for evaluating the reliability of labeling of the training images to be used for learning the deep learning network in accordance with one example of the present disclosure.

A method of the similar-image selection network 200 selecting the validation images with their own true labels having the similar shooting environments is described by referring to FIG. 3 as below.

If the reliability-evaluating device 100 inputs the acquired original images into the similar-image selection network 200, the similar-image selection network 200 may generate manipulated images by cropping and resizing each of regions of each of sliding windows on the original images. Herein, as another example, the reliability-evaluating device 100, not the similar-image selection network 200, may generate the manipulated images by cropping and resizing each of regions of each of the sliding windows on the original images, and may input each of the manipulated images corresponding to the original images into the similar-image selection network 200.

Then, the similar-image selection network 200 may instruct an image classification CNN 210, i.e., a CNN for image classification, to classify the manipulated images, to thereby generate each piece of top-k class information. As one example, the image classification CNN 210 may generate each of feature maps of each of the manipulated images, may classify objects or a background into class groups like day, bird, spring, cloud, mountain, tree, house, cycle, person, road, and dog by using each of the feature maps, and may output top k pieces of the class information. Herein, top 4 pieces of the class information is shown in the drawing, but the scope of the present disclosure is not limited thereto. Also, the drawing shows multiple image classification CNNs 210 each of which corresponds to each of the manipulated images, however, a single image classification CNN may be used to generate the top-k pieces of the class information corresponding to each of the manipulated images, or a certain number of the image classification CNNs different from the number of the corresponding manipulated images may be used to generate the top-k pieces of the class information.

And the similar-image selection network 200 may generate at least one bag-of-words histogram of the original images by applying at least one operation, of creating at least one bag of words to all of the original images, by referring to the top-k pieces of the class information corresponding to each of the manipulated images outputted from the image classification CNN 210.

Thereafter, the similar-image selection network 200 may select a predetermined number of the validation image candidates with their own true labels, in an order of closest to the bag-of-words histogram, among the validation image candidates with their own true labels, and may transmit the predetermined number of the validation image candidates and the original images to the auto-labeling network 300, for auto-labeling. Herein, the similar-image selection network 200 may manage the difficult-validation images with their own true labels among the predetermined number of the validation image candidates and difficult-original images, such that the number of the difficult-validation images with their own true labels among the predetermined number of the validation image candidates with their own true labels has a certain ratio to the number of the difficult-original images among the original images. As one example, the number of the difficult-validation images with their own true labels among the predetermined number of the validation image candidates with their own true labels may be 10% of the number of the difficult-original images among the original images. The definition of images with prefixes of "easy" and "difficult" will be described later.

Figure 4:
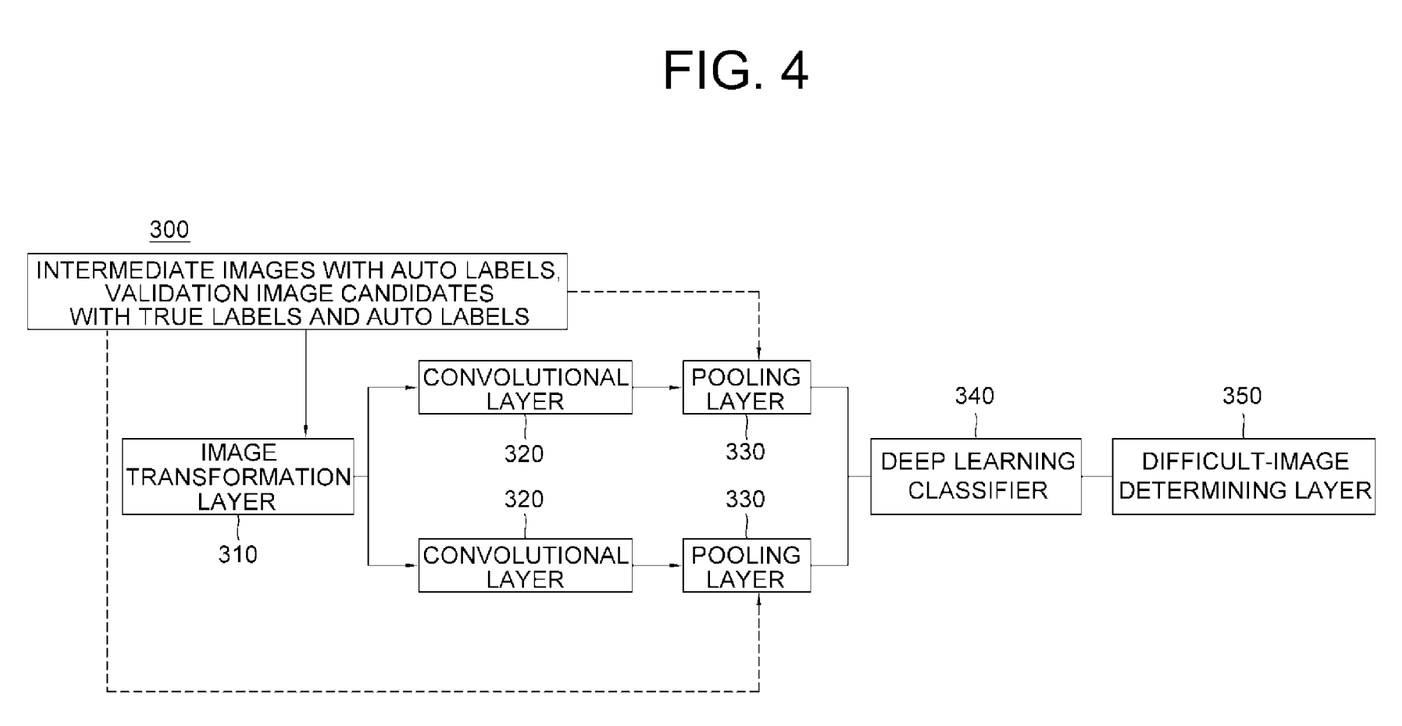
FIG. 4 is a drawing schematically illustrating a method for selecting sample images for label-inspecting by an auto-labeling network in a method for evaluating the reliability of labeling of the training images to be used for learning the deep learning network in accordance with one example of the present disclosure.

A method for the auto-labeling network 300 generating the original images with their own auto labels and the validation image candidates with their own true labels and auto labels by auto-labeling the original images and the validation image candidates with their own true labels, to thereby select easy images and difficult images is described by referring to FIG. 4. The easy images and the difficult images are defined later.

The auto-labeling network 300 may instruct an image transformation layer 310 to use as is or transform the original images with their own auto labels and the validation image candidates with their own true labels and auto labels, to thereby generate a first image and a second image. Herein, at least one of the first image and the second image may be transformed from the original images with their auto labels and the validation image candidates with their own true labels and auto labels.

In a process of generating the first image and the second image by using the image transformation layer 310, at least one image pair of the first image and the second image respectively corresponding to the original images with their own auto labels and the validation image candidates with their own true labels and auto labels may be generated by using multiple transformation pairs.

The transformation pairs may be represented as follows, as one example.

| Index | The first image | The second image |
| --- | --- | --- |
| 1 | Resized 480P | Resized 540P |
| 2 | Resized 640P | Resized 720P |
| 3 | Resized 900P | Resized 1080P |
| 4 | Original | Horizontal flip |

-continued

| Index | The first image | The second image |
|---|---|---|
| 5 | Original | Gamma 0.5 |
| 6 | Original | Gamma 1.5 |

That is, more than one image pair of the first image and the second image, corresponding to the transformation pairs set according to one of the original images with their own auto labels and the validation images with their own true labels and auto labels, which are consecutively inputted in an arbitrary order, may be generated.

Next, the auto-labeling network 300 may instruct one or more convolutional layers 320 to apply one or more convolution operations respectively to the first image and the second image, to thereby generate at least one first feature map and at least one second feature map. Herein, each of the convolutional layers 320 may be at least one auto-labeling convolutional layer in the auto-labeling network which automatically labels the images. That is, if the auto-labeling network uses ensemble of multi transforms, the transformation pairs may be defined by using only the transforms used by the auto-labeling network, and as a result, a feature map outputted from the auto-labeling convolutional layer in the auto-labeling network may be used without any further process, thus time required for computation of the feature map is reduced.

Thereafter, the auto-labeling network 300 may instruct one or more pooling layers 330 to generate each of first pooled feature maps by respectively applying one or more pooling operations to each region, corresponding to each of auto-labeled boxes of the original image with its own auto labels or the validation image candidate with its own true labels and auto labels, on the first feature map, and to generate each of second pooled feature maps by respectively applying the pooling operations to each region, corresponding to each of the auto-labeled boxes of the original image with its own auto labels or the validation image candidate with its own true labels and auto labels, on the second feature map, and to generate each of concatenated feature maps, corresponding to each of the auto-labeled boxes, by concatenating each of the first pooled feature maps and each of the second pooled feature maps respectively corresponding to said each of the auto-labeled boxes. Herein, although FIG. 4 shows two of the convolutional layers 320 and two of the pooling layers 330, a single convolutional layer and a single pooling layer may be used for the convolution operations on the first image and the second image and for the pooling operations on the first feature map and the second feature map.

Next, the auto-labeling network 300 may instruct the deep learning classifier 340 to acquire each of the concatenated feature maps as its input, to thereby generate the class information which classifies each of the auto-labeled boxes into an abnormal class group or a normal class group. Herein, the abnormal class group may include a misdetection class group and a non-detection class group, and the normal class group may include a class group for boxes each of which is classified as an object and a class group for boxes each of which is classified as the background, where the boxes are at least part of the auto-labeled boxes that are not in the abnormal class group. Classification of the auto-labeled boxes is described in a learning process of the deep learning classifier by referring to FIG. 5.

Thereafter, the auto-labeling network 300 may instruct a difficult-image determining layer 350 to (i) calculate each of one or more probabilities of each of abnormal class elements in the abnormal class group by referring to each piece of the class information on each of the auto-labeled boxes, and (ii) determine whether the original image with its own auto labels or the validation image candidate with its own true labels and auto labels is a difficult image, to be described later, by using each of the probabilities of each of the abnormal class elements.

Herein, a sigmoid function may be applied to outputs of the deep learning classifier and then the probabilities of each of the abnormal class elements may be calculated. The probabilities of each of the abnormal class elements may include each of probabilities of misdetection class elements in the misdetection class group and each of probabilities of non-detection class elements in the non-detection class group.

As one example, the probabilities of the misdetection class elements FP may be represented by $p(b_i:FP|I_A,I_B)$ and the probabilities of the non-detection class elements FN may be represented by $p(b_i:FN|I_A,I_B)$.

Herein, $b_i$ may be one of the auto-labeled boxes, $I_A$ may be the first image, and $I_B$ may be the second image.

Also, for each of the auto-labeled boxes, the auto-labeling network 300 may calculate each of the probabilities of each of the abnormal class elements corresponding to each of the transformation pairs and may calculate at least one weighted average over said each of the probabilities of each of the abnormal class elements.

That is, the probabilities $p(b_i:FP)$ of the misdetection class elements and the probabilities $p(b_i:FN)$ of the non-detection class elements may be expressed as follows.

$$p(b_i:FP) = \frac{1}{\sum_j w_j} \sum_j w_j p(b_i:FP | I_{A_j}, I_{B_j})$$

$$p(b_i:FN) = \frac{1}{\sum_j w_j} \sum_j w_j p(b_i:FN | I_{A_j}, I_{B_j})$$

Herein, because the probabilities $p(b_i:FP)$ of the misdetection class elements and the probabilities $p(b_i:FN)$ of the non-detection class elements are linear functions of weights, the weights may be optimized by using a constrained optimization with constraints $\Sigma_j w_j=1$.

Then, if at least one generalized mean over each of the probabilities of each of the abnormal class elements is equal to or greater than a prescribed value, the auto-labeling network 300 may determine the original image with its own auto labels or the validation image candidate with its own true labels and auto labels as the difficult image.

As one example, the auto-labeling network 300 may calculate each of probabilities p(I:Difficult), by using the following generalized mean, of the original image with its own auto labels or the validation image candidate with its own true labels and auto labels being the difficult image, by referring to each of the probabilities $p(b_i:FP)$ of the misdetection class elements and each of the probabilities $p(b_i:FN)$ of the non-detection class elements of each of the auto-labeled boxes.

$$p(I:\text{Difficult}) = \left( \frac{1}{N_I} \sum_{b_i \in B_I} p(b_i:FP)^p + \frac{1}{N_I} \sum_{b_i \in B_I} p(b_i:FN)^p \right)^{1/p} \geq \gamma$$

And, if each of the probabilities p(I:Difficult) calculated by referring to each of the probabilities p(b$_i$:FP) of the misdetection class elements and each of the probabilities p(b$_i$:FN) of the non-detection class elements of each of the auto-labeled boxes is determined as larger than or equal to one or more prescribed values, the auto-labeling network 300 may determine the original image with its own auto labels or the validation image candidate with its own true labels and auto labels as the difficult image. Herein, the difficult image may represent an image which has a probability of being automatically labeled incorrectly larger than or equal to the prescribed values, and the prescribed values may include a first prescribed value, a second prescribed value, a third prescribed value, and a fourth prescribed value, to be described later.

Herein, the prescribed values may be at least one highest hit rate among hit rates for correct answers to the validation image candidates which are manually inspected after auto-labeling of the auto-labeling network.

Thereafter, if the original image with its own auto labels or the validation image candidate with its own true labels and auto labels is determined as the difficult image, the auto-labeling network 300 may determine the original image with its own auto labels or the validation image candidate with its own true labels and auto labels as a sample image for label-inspecting. That is, the original images with their own auto labels may be assorted into the easy-original images with their own auto labels and the difficult-original images with their own auto labels, and the validation image candidates with their own true labels and auto labels may be assorted into easy-validation images with their own true labels and auto labels and difficult-validation images with their own true labels and auto labels. Herein, (i) the easy-validation images with their own true labels and auto labels may represent images, among the validation image candidates with their own true labels and auto labels, having a probability of being automatically labeled incorrectly less than the first prescribed value, (ii) the difficult-validation images with their own true labels and auto labels may represent images, among the validation image candidates with their own true labels and auto labels, having a probability of being automatically labeled incorrectly equal to or greater than the second prescribed value, (iii) the easy-original images with their own auto labels may represent images, among the original images with their own auto labels, having a probability of being automatically labeled incorrectly less than the third prescribed value, and (iv) the difficult-original images with their own auto labels may represent images, among the original images with their own auto labels, having a probability of being automatically labeled incorrectly equal to or greater than the fourth prescribed value. At least part of the first prescribed value, the second prescribed value, the third prescribed value, and the fourth prescribed value may be same with or different from each other. Herein, the auto-labeling network 300 may identify regions, corresponding to the auto-labeled boxes classified into the abnormal class group, on the difficult-original images with their own auto labels and the difficult-validation images with their own true labels and auto labels determined as the difficult images, for easy examination by an inspector.

Figure 5:
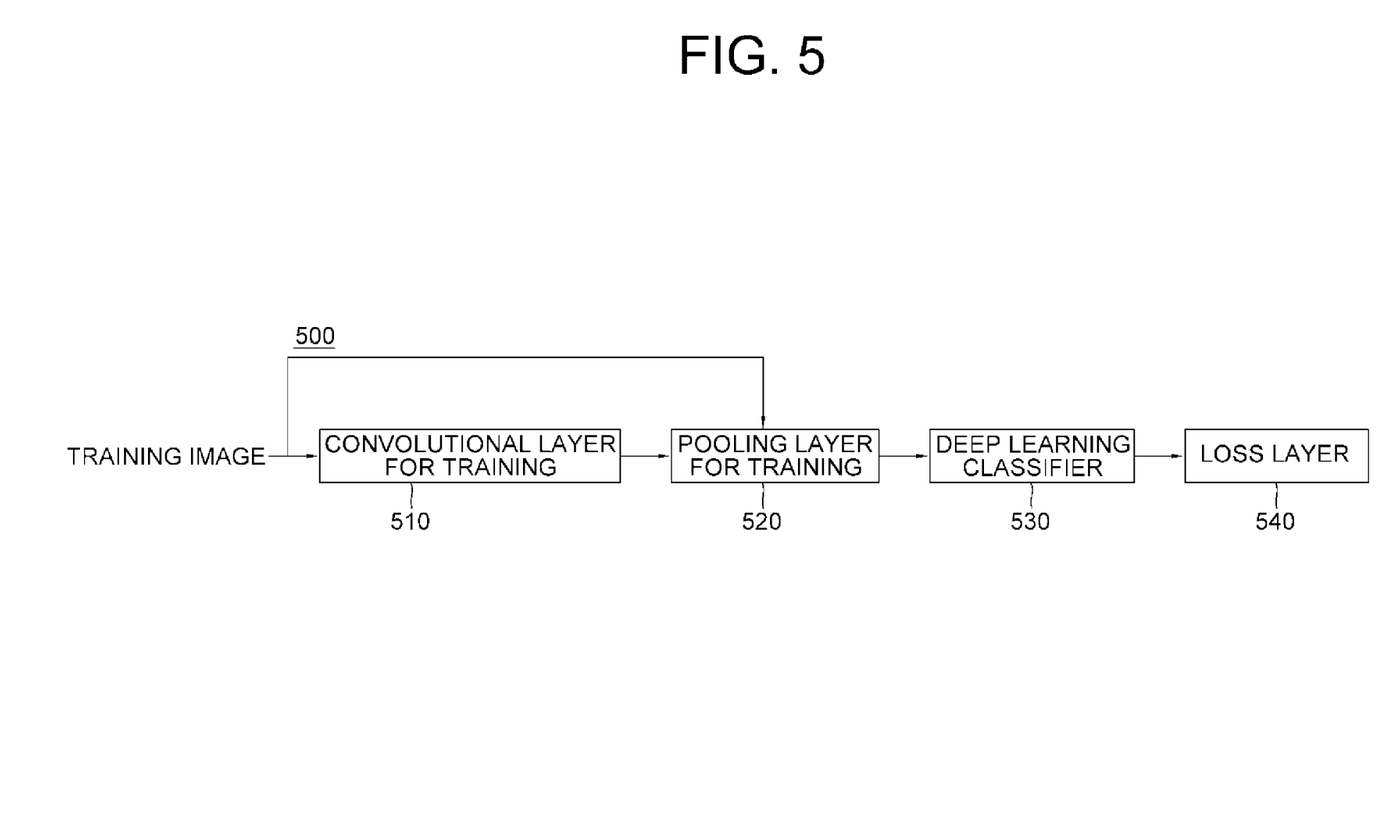
FIG. 5 is a drawing schematically illustrating a method for learning a deep learning classifier which selects the sample images for label-inspecting by the auto-labeling network in a method for evaluating the reliability of labeling of the training images to be used for learning the deep learning network in accordance with one example of the present disclosure.

Meanwhile, the deep learning classifier may include multiple fully connected layers or a fully convolutional network, and a process of learning the deep learning classifier is described by referring to FIG. 5 as below.

If at least one training image including auto-boxes labeled by the auto-labeling network is acquired, a learning device 500 may instruct a convolutional layer 510 for training to apply its convolution operations to the training image, to thereby generate a feature map for training.

Herein, the auto-boxes on the training image may be generated arbitrarily for training, unlike the auto-boxes labeled by the auto-labeling network.

Also, the learning device 500 may include a memory (not illustrated) for storing instructions to learn the deep learning class classifier, and a processor (not illustrated) for performing learning of the deep learning class classifier corresponding to the instructions in the memory.

Specifically, the learning device 500 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software. The processor of the computing device may include hardware configuration of MPU (Micro Processing Unit) or CPU (Central Processing Unit), cache memory, data bus, etc. Additionally, the computing device may further include OS and software configuration of applications that achieve specific purposes. Such description of the computing device does not exclude an integrated device including any combination of a processor, a memory, a medium, or any other computing components for implementing the present disclosure.

And, the learning device 500 may instruct a pooling layer 520 for training to generate pooled feature maps for training by respectively applying its pooling operations to each of regions, corresponding to the auto-boxes, on the feature map for training.

Then, the learning device 500 may instruct the deep learning classifier 530 to acquire each of the pooled feature maps for training corresponding to each of the auto-boxes as its input and to generate the class information which classifies the auto-boxes into the abnormal class group or the normal class group.

Herein, the class information may include the abnormal class group having the misdetection class group and the non-detection class group. And the class information may include two dimensional outputs.

As one example, the misdetection class group (FP, y$_i$=[1, 0]) may refer to a case that a first specific true box with the class information same as that of a first specific auto-box does not overlap with any other of the true boxes by a value equal to or greater than a first predetermined threshold.

Herein, the misdetection class group (FP, y$_i$[1,0]) may be represented as $$\max_{t_j : c[b_i] = c[t_j]} IoU(b_i, t_j) < \alpha.$$

And the non-detection class group (FN, y$_i$=[0,1]) may refer to a case that, on condition that a second specific auto-box with the class information same as that of a second specific true box does not overlap with any other of the auto-boxes by a value equal to or greater than a second predetermined threshold, a third specific auto-box overlaps with the second specific true box by a value equal to or greater than a third predetermined threshold.

Herein, the non-detection class group (FN, $y_i=[0,1]$) may be represented as $$\max_{b_i: c[b_i]=c[t_j]} IoU(b_i, t_j) < \alpha, y_i = [0, 1]\} : IoU(b_i, t_j) \geq \beta.$$

As one example, it may be configured such that $\alpha=0.9$ and $\beta=0.5$, but the scope of the present disclosure is not limited thereto.

And the normal class group ($y_i=[0, 0]$) may include any other class groups excluding the misdetection class group and the non-detection class group, and may correspond to the objects and the background.

Meanwhile, to prevent an imbalance of the classes, the learning device 500 may manage the misdetection class group, the non-detection class group, and the normal class group, such that the number of one of a class group, in the abnormal class group, with more group elements is equal to or less than the number of the other class group, in the abnormal class group, with less group elements multiplied by a predetermined first multiplier, and that the number of group elements of the normal class group is equal to the number of group elements of the abnormal class group multiplied by a predetermined second multiplier.

Herein, the learning device 500 may adjust the number of group elements of the misdetection class group FP, the number of group elements of the non-detection class group FN, and the number of group elements of the normal class group by using a random sampling.

Then, the learning device 500 may instruct at least one loss layer 540 to calculate one or more losses by referring to each piece of the class information on each of the auto-labeled boxes and to corresponding one or more ground truths, to thereby learn at least part of parameters of the deep learning classifier 530 by backpropagating the losses.

Herein, the learning device 500 may perform the backpropagating by using a cross-entropy loss.

Meanwhile, the learning may mean adjustment of weights which are synaptic strengths of any of two connected layers in a neural network of the deep learning classifier 530, such that the losses become smaller.

As one example, if the backpropagating is performed by using a stochastic gradient descent (SGD), each of the weights may be adjusted as follows.

$$\Delta w_{ij}(t+1) = \Delta w_{ij}(t) + lr \frac{\partial C}{\partial w_{ij}}$$

lr may depict a learning rate and C may depict a cost function.

Herein, the cost function may be determined by referring to factors like types of learning, e.g., supervised learning, unsupervised learning, and reinforcement learning, and an activation function, etc.

For example, if a learning to solve a multi-class classification problem is performed, a softmax function and a cross-entropy function may be used respectively for the activation function and the cost function in general.

The softmax function may be represented as $$p_j = \frac{\exp(x_j)}{\sum_k \exp(x_k)},$$

and the cost function may be represented as $C=-\Sigma_j d_j \log(p_j)$.

Herein, $p_j$ may depict a class probability, and $x_j$ and $x_k$ may depict respectively a total input into a unit j and the total input into a unit k. And, $d_j$ may depict a target probability of an output unit j, and $p_j$ may depict a probability output of the output unit j after its corresponding activation function is applied.

The above example of the backpropagating the losses shows the stochastic gradient descent (SGD), however, the scope of the present disclosure is not limited thereto, and the backpropagating for learning of the neural network may be performed by using a momentum, a Nesterov's Accelerated Gradient (NAG), an AdaGrad (Adaptive Gradient), an RMSProp, an AdaDelta (Adaptive Delta), or an Adam (Adaptive Moment Estimation).

By referring to FIG. 2 again, the reliability-evaluating device 100 may acquire the easy-original images with their own auto labels and the easy-validation images with their own true labels and auto labels from the auto-labeling network 300, and may evaluate the reliability of the auto-labeling network 300 by referring to the true labels and the auto labels of the easy-validation images with their true labels and auto labels.

Herein, supposing that Precision(X, L)=1−[the number of misdetection boxes in L]/[the number of total boxes in L], Recall(X, L)=1−[the number of non-detection boxes in X]/[the number of the total boxes in X], and that the true labels and the auto labels of the easy-validation images with their own true labels and auto labels are XAL and LAL, respectively, the reliability Reliability(AL) of the auto-labeling network 300 may be evaluated as follows.

$$\text{Reliability}(AL) = F_1(X_{AL}, L_{AL}) = 2\frac{\text{Precision}(X_{AL}, L_{AL}) \times \text{Recall}(X_{AL}, L_{AL})}{\text{Precision}(X_{AL}, L_{AL}) + \text{Recall}(X_{AL}, L_{AL})}$$

Also, if the difficult-original images with their auto labels and manual labels and the difficult-validation images with their own true labels, auto labels and manual labels are acquired from a manual-labeling device 400 which are generated by manually labeling the difficult-original images with their own auto labels and the difficult-validation images with their own true labels and auto labels outputted from the auto-labeling network 300, then the reliability-evaluating device 100 may evaluate the reliability of the manual-labeling device 400 by referring to the true labels and the auto labels of the difficult-validation images with their own true labels, auto labels and manual labels.

Herein, supposing that Precision(X, L)=1−[the number of misdetection boxes in L]/[the number of total boxes in L], Recall(X, L)=1−[the number of non-detection boxes in X]/[the number of the total boxes in X], and that the true labels and the manual labels of the difficult-validation images with their own true labels, auto labels and manual labels are $X_{HL}$ and $L_{HL}$, respectively, the reliability Reliability(HL) of the auto-labeling network 400 may be evaluated as follows.

$$\text{Reliability}(HL) = F_1(X_{HL}, L_{HL}) = 2 \frac{\text{Precision}(X_{HL}, L_{HL}) \times \text{Recall}(X_{HL}, L_{HL})}{\text{Precision}(X_{HL}, L_{HL}) + \text{Recall}(X_{HL}, L_{HL})}$$

Then, if the reliability of the auto-labeling network 300 is equal to or greater than the first predetermined threshold, the reliability-evaluating device 100 may determine at least part of the easy-original images with their own auto labels generated by the auto-labeling network 300 as the training images with their own true labels.

Also, if the reliability of the manual-labeling device 400 is equal to or greater than the second predetermined threshold, the reliability-evaluating device 100 may determine at least part of the difficult-original images with their own auto labels and the manual labels generated by the manual-labeling device 400 as the training images with their own true labels.

In addition to this, the reliability-evaluating device 100 may determine specific difficult-original images with their own auto labels and manual labels, not determined as the training images with their own true labels, among the difficult-original images with their own auto labels and the manual labels outputted from the manual labeling device 400, as the validation image candidates with their own true labels, to use the validation image candidates with their own true labels for evaluating the reliability of auto-labeling next time.

If an accuracy of auto-labeling becomes high, cases of the auto labels matching the true labels become frequent, and thus the need for correction decreases when inspecting the true labels. However, in accordance with one example of the present disclosure, if the difficult images only are given, the correction can be performed even when the accuracy is high, and also the difficult images are selected from the original images as well as from the validation images, and as a result, the possibility of the inspector taking notice of whether validation is performed becomes low and the inspector can be evaluated properly.

The present disclosure has an effect of properly evaluating the reliability of labeling by selectively inspecting images that are difficult to label among images automatically labeled by the auto-labeling device.

The present disclosure has another effect of properly evaluating the reliability of labeling by selecting and adding the validation images having the shooting environments similar to those of the original images, for auto-labeling, to thereby prevent the inspectors from easily distinguishing between the original images and the validation images.

The present disclosure has still another effect of providing optimized sampling processes for selecting a valid image among similar images.

The present disclosure has still yet another effect of reducing annotation costs by reducing the number of the inspectors via inspecting the images that are difficult to label.

The present disclosure has still yet another effect of recognizing surroundings by applying a bag-of-words model.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for evaluating a reliability of labeling one or more training images to be used for learning a deep learning network, comprising steps of:
    (a) a reliability-evaluating device, if one or more original images are acquired, instructing a similar-image selection network to select validation image candidates with their own true labels having shooting environments similar to those of the original images, and instructing an auto-labeling network to auto-label the validation image candidates with their own true labels and the original images by inputting the validation image candidates with their own true labels and the original images into the auto-labeling network, wherein the original images are images that are unlabeled; and
    (b) the reliability-evaluating device, (i) if easy-validation images with their own true labels and auto labels are acquired from the auto-labeling network, evaluating a reliability of the auto-labeling network by referring to the true labels and the auto labels of the easy-validation images, and (ii) if difficult-validation images with their own true labels, auto labels and manual labels are acquired from a manual-labeling device, which are acquired by applying manually labeling operation to difficult-validation images with their own true labels and auto labels, evaluating a reliability of the manual-labeling device by referring to the true labels and the manual labels of the difficult-validation images,
    wherein the easy-validation images with their own true labels and auto labels represent images, among the auto-labeled validation image candidates with their own true labels, having a probability of being automatically labeled incorrectly less than a first prescribed value and the difficult-validation images with their own true labels and auto labels represent images, among the auto-labeled validation image candidates with their own true labels, having a probability of being automatically labeled incorrectly equal to or greater than a second prescribed value, wherein the reliability-evaluating device instructs the auto-labeling network to determine the validation image candidates with their own true labels as the easy-validation images in response to having the probability of being automatically labeled incorrectly less than the first prescribed value, and wherein the reliability-evaluating device instructs the auto-labeling network to determine the validation image candidates with their own true labels as the difficult-validation images in response to having the probability of being automatically labeled incorrectly equal to or greater than the second prescribed value.

2. The method of claim 1, wherein the method further comprises a step of:

(c) the reliability-evaluating device, (i) if the reliability of the auto-labeling network is equal to or greater than a first predetermined threshold, determining at least part of easy-original images with their own auto labels generated by the auto-labeling network as the training images with their own true labels, and (ii) if the reliability of the manual-labeling device is equal to or greater than a second predetermined threshold, determining at least part of difficult-original images with their own auto labels and the manual labels generated by the manual-labeling device as the training images with their own true labels, wherein the easy-original images with their own auto labels represent images, among the original images with their own auto labels generated by auto-labeling the original images, having a probability of being automatically labeled incorrectly less than a third prescribed value and the difficult-original images with their own auto labels represent images, among the original images with their own auto labels generated by auto-labeling the original images, having a probability of being automatically labeled incorrectly equal to or greater than a fourth prescribed value.

3. The method of claim 2, wherein the reliability-evaluating device determines specific difficult-original images with their own auto labels and manual labels, not determined as the trainings image with their own true labels, among the difficult-original images with their own auto labels and the manual labels as the validation image candidates with their own true labels.

4. The method of claim 1, wherein, at the step of (a), the reliability-evaluating device instructs the similar-image selection network to (i) (i-1) acquire manipulated images generated by cropping and resizing each of regions of sliding windows on the original images, (i-2) generate each piece of top-k class information by classifying the manipulated images via an image classification CNN, and (i-3) generate at least one bag-of-words histogram of the original images by applying at least one operation, of creating at least one bag of words by referring to the top-k class information, to all of the original images, and (ii) selects a predetermined number of the validation image candidates with their own true labels, in an order of closest to the bag-of-words histogram, among the validation image candidates with their own true labels.

5. The method of claim 4, wherein the reliability-evaluating device instructs the similar-image selection network to manage the difficult-validation images with their own true labels among the predetermined number of the validation image candidates and difficult-original images with their own auto labels, such that the number of the difficult-validation images with their own true labels among the predetermined number of the validation image candidates with their own true labels has a certain ratio to the number of the difficult-original images with their own auto labels among the original images.

6. The method of claim 1, wherein, at the step of (a), the reliability-evaluating device instructs the auto-labeling network to generate the original images with their own auto labels and the validation image candidates with their own true labels and auto labels by auto-labeling the original images and the validation image candidates with their own true labels, then (i) (i-1) generates a first image and a second image, at least one of which is transformed from one of the original images with their own auto labels and the validation image candidates with their own true labels and auto labels, wherein if only one of the first image and the second image is transformed from the original images with their own auto labels and the validation image candidates, then the other is one of the original images and the validation image candidates used as is, (i-2) instructs one or more convolutional layers to generate at least one first feature map and at least one second feature map by respectively applying one or more convolution operations respectively to the first image and the second image, and (i-3) instructs one or more pooling layers to generate one or more first pooled feature maps and one or more second pooled feature maps, by respectively applying one or more pooling operations to each of regions, corresponding to each of auto-labeled boxes of the original images with their own auto labels and the validation image candidates with their own true labels and auto labels, on each of the first feature map and each of the second feature map, and to generate one or more concatenated feature maps each of which corresponds to each of the auto-labeled boxes by concatenating each of the first pooled feature maps and each of the corresponding second pooled feature maps, (ii) instructs a deep learning classifier to acquire each of the concatenated feature maps corresponding to each of the auto-labeled boxes as its input, to thereby generate class information which classifies each of the auto-labeled boxes into an abnormal class group or a normal class group, and (iii) (iii-1) calculates each of one or more probabilities of each of abnormal class elements in the abnormal class group by referring to each piece of the class information on each of the auto-labeled boxes, (iii-2) assorts the original images with their own auto labels into easy-original images with their own auto labels and difficult-original images with their own auto labels by using each of the probabilities of each of the abnormal class elements, and (iii-3) assorts the validation image candidates with their own true labels and auto labels into the easy-validation images with their own true labels and auto labels and the difficult-validation images with their own true labels and auto labels, wherein the easy-original images with their own auto labels represent images, among the original images with their own auto labels, having a probability of being automatically labeled incorrectly less than a third prescribed value and the difficult-original images with their own auto labels represent images, among the original images with their own auto labels, having a probability of being automatically labeled incorrectly equal to or greater than a fourth prescribed value.

7. The method of claim 1, wherein, at the step of (b), the reliability-evaluating device, supposing that Precision(X, L)=1−[the number of misdetection boxes in L]/[the number of total boxes in L], Recall(X, L)=1−[the number of non-detection boxes in X]/[the number of the total boxes in X], and that the true labels and the auto labels of the easy-validation images are XAL and LAL, respectively, the reliability (Reliability(AL)) of the auto-labeling device is estimated by $$\text{Reliability}(AL) = F_1(X_{AL}, L_{AL}) = 2\frac{\text{Precision}(X_{AL}, L_{AL}) \times \text{Recall}(X_{AL}, L_{AL})}{\text{Precision}(X_{AL}, L_{AL}) + \text{Recall}(X_{AL}, L_{AL})}.$$

8. The method of claim 1, wherein, at the step of (b), the reliability-evaluating device, supposing that Precision(X, L)=1−[the number of misdetection boxes in L]/[the number of total boxes in L], Recall(X, L)=1−[the number of non-detection boxes in X]/[the number of total boxes in X], and that the true labels and the manual labels of the difficult-validation images XHL and LHL, respectively, the reliability Reliability(HL) of the manual-labeling device is estimated by $$\text{Reliability}(HL) = F_1(X_{HL}, L_{HL}) = 2\frac{\text{Precision}(X_{HL}, L_{HL}) \times \text{Recall}(X_{HL}, L_{HL})}{\text{Precision}(X_{HL}, L_{HL}) + \text{Recall}(X_{HL}, L_{HL})}.$$

9. A reliability-evaluating device for evaluating a reliability of labeling one or more training images to be used for learning a deep learning network, comprising:
at least one memory that stores instructions; and
at least one processor configured to execute the instructions to: perform processes of: (I) if one or more original images are acquired, instructing a similar-image selection network to select validation image candidates with their own true labels having shooting environments similar to those of the original images, and instructing an auto-labeling network to auto-label the validation image candidates with their own true labels and the original images by inputting the validation image candidates with their own true labels and the original images into the auto-labeling network, wherein the original images are images that are unlabeled, and (II) (i) if easy-validation images with their own true labels and auto labels are acquired from the auto-labeling network, evaluating a reliability of the auto-labeling network by referring to the true labels and the auto labels of the easy-validation images, and (ii) if difficult-validation images with their own true labels, auto labels and manual labels are acquired from a manual-labeling device, which are acquired by applying manually labeling operation to difficult-validation images with their own true labels and auto labels, evaluating a reliability of the manual-labeling device by referring to the true labels and the manual labels of the difficult-validation images, wherein
the easy-validation images with their own true labels and auto labels represent images, among the auto-labeled validation image candidates with their own true labels, having a probability of being automatically labeled incorrectly less than a first prescribed value and the difficult-validation images with their own true labels and auto labels represent images, among the auto-labeled validation image candidates with their own true labels, having a probability of being automatically labeled incorrectly equal to or greater than a second prescribed value, the at least one processor instructs the auto-labeling network to determine the validation image candidates with their own true labels as the easy-validation images in response to having the probability of being automatically labeled incorrectly less than the first prescribed value, and the at least one processor instructs the auto-labeling network to determine the validation image candidates with their own true labels as the difficult-validation images in response to having the probability of being automatically labeled incorrectly equal to or greater than the second prescribed value.

10. The reliability-evaluating device of claim 9, wherein the processor further performs a process of: (III) (i) if the reliability of the auto-labeling network is equal to or greater than a first predetermined threshold, determining at least part of easy-original images with their own auto labels generated by the auto-labeling network as the training images with their own true labels, and (ii) if the reliability of the manual-labeling device is equal to or greater than a second predetermined threshold, determining at least part of difficult-original images with their own auto labels and the manual labels generated by the manual-labeling device as the training images with their own true labels,
wherein the easy-original images with their own auto labels represent images, among the original images with their own auto labels generated by auto-labeling the original images, having a probability of being automatically labeled incorrectly less than a third prescribed value and the difficult-original images with their own auto labels represent images, among the original images with their own auto labels generated by auto-labeling the original images, having a probability of being automatically labeled incorrectly equal to or greater than a fourth prescribed value.

11. The reliability-evaluating device of claim 10, wherein the processor determines specific difficult-original images with their own auto labels and manual labels, not determined as the trainings image with their own true labels, among the difficult-original images with their own auto labels and the manual labels as the validation image candidates with their own true labels.

12. The reliability-evaluating device of claim 9, wherein, at the process of (I), the processor instructs the similar-image selection network to (i) (i-1) acquire manipulated images generated by cropping and resizing each of regions of sliding windows on the original images, (i-2) generate each piece of top-k class information by classifying the manipulated images via an image classification CNN, and (i-3) generate at least one bag-of-words histogram of the original images by applying at least one operation, of creating at least one bag of words by referring to the top-k class information, to all of the original images, and (ii) selects a predetermined number of the validation image candidates with their own true labels, in an order of closest to the bag-of-words histogram, among the validation image candidates with their own true labels.

13. The reliability-evaluating device of claim 12, wherein the processor instructs the similar-image selection network to manage the difficult-validation images with their own true labels among the predetermined number of the validation image candidates and difficult-original images with their own auto labels, such that the number of the difficult-validation images with their own true labels among the predetermined number of the validation image candidates with their own true labels has a certain ratio to the number of the difficult-original images with their own auto labels among the original images.

14. The reliability-evaluating device of claim 9, wherein, at the process of (I), the processor instructs the auto-labeling network to generate the original images with their own auto labels and the validation image candidates with their own true labels and auto labels by auto-labeling the original images and the validation image candidates with their own true labels, then (i) (i-1) generates a first image and a second image, at least one of which is transformed from one of the original images with their own auto labels and the validation image candidates with their own true labels and auto labels, wherein if only one of the first image and the second image is transformed from the original images with their own auto labels and the validation image candidates, then the other is one of the original images and the validation image candidates used as is, (i-2) instructs one or more convolutional layers to generate at least one first feature map and at least one second feature map by respectively applying one or more convolution operations respectively to the first image and the second image, and (i-3) instructs one or more pooling layers to generate one or more first pooled feature maps and one or more second pooled feature maps, by respectively applying one or more pooling operations to each of regions, corresponding to each of auto-labeled boxes of the original images with their own auto labels and the validation image candidates with their own true labels and auto labels, on each of the first feature map and each of the second feature map, and to generate one or more concatenated feature maps each of which corresponds to each of the auto-labeled boxes by concatenating each of the first pooled feature maps and each of the corresponding second pooled feature maps, (ii) instructs a deep learning classifier to acquire each of the concatenated feature maps corresponding to each of the auto-labeled boxes as its input, to thereby generate class information which classifies each of the auto-labeled boxes into an abnormal class group or a normal class group, and (iii) (iii-1) calculates each of one or more probabilities of each of abnormal class elements in the abnormal class group by referring to each piece of the class information on each of the auto-labeled boxes, (iii-2) assorts the original images with their own auto labels into easy-original images with their own auto labels and difficult-original images with their own auto labels by using each of the probabilities of each of the abnormal class elements, and (iii-3) assorts the validation image candidates with their own true labels and auto labels into the easy-validation images with their own true labels and auto labels and the difficult-validation images with their own true labels and auto labels, wherein the easy-original images with their own auto labels represent images, among the original images with their own auto labels, having a probability of being automatically labeled incorrectly less than a third prescribed value and the difficult-original images with their own auto labels represent images, among the original images with their own auto labels, having a probability of being automatically labeled incorrectly equal to or greater than a fourth prescribed value.

15. The reliability-evaluating device of claim 9, wherein, at the process of (II), the processor, supposing that Precision (X, L)=1−[the number of misdetection boxes in L]/[the number of total boxes in L], Recall(X, L)=1−[the number of non-detection boxes in X]/[the number of the total boxes in X], and that the true labels and the auto labels of the easy-validation images are XAL and LAL, respectively, the reliability (Reliability(AL)) of the auto-labeling device is estimated by $$\text{Reliability}(AL) = F_1(X_{AL}, L_{AL}) = 2\frac{\text{Precision}(X_{AL}, L_{AL}) \times \text{Recall}(X_{AL}, L_{AL})}{\text{Precision}(X_{AL}, L_{AL}) + \text{Recall}(X_{AL}, L_{AL})}.$$

16. The reliability-evaluating device of claim 9, wherein, at the process of (II), the processor, supposing that Precision (X, L)=1−[the number of misdetection boxes in L]/[the number of total boxes in L], Recall(X, L)=1−[the number of non-detection boxes in X]/[the number of total boxes in X], and that the true labels and the manual labels of the difficult-validation images XHL and LHL, respectively, the reliability Reliability(HL) of the manual-labeling device is estimated by $$\text{Reliability}(HL) = F_1(X_{HL}, L_{HL}) = 2\frac{\text{Precision}(X_{HL}, L_{HL}) \times \text{Recall}(X_{HL}, L_{HL})}{\text{Precision}(X_{HL}, L_{HL}) + \text{Recall}(X_{HL}, L_{HL})}.$$

* * * * *